(12) United States Patent
Derrick et al.

(10) Patent No.: US 8,511,898 B2
(45) Date of Patent: *Aug. 20, 2013

(54) GAS BEARING AND FABRICATION METHOD

(75) Inventors: Hugo George Derrick, Bristol (GB); Stephen Paul Hunter, Bristol (GB); Brendon Noel Joseph Callinan, Dursley (GB)

(73) Assignee: Renishaw PLC, Wotton-under-Edge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/461,560

(22) Filed: May 1, 2012

(65) Prior Publication Data

US 2012/0257846 A1 Oct. 11, 2012

Related U.S. Application Data

(63) Continuation of application No. 12/308,687, filed as application No. PCT/GB2007/002402 on Jun. 26, 2007, now Pat. No. 8,186,882.

(30) Foreign Application Priority Data

Jun. 30, 2006 (GB) .................................. 0612979.5

(51) Int. Cl.
*F16C 32/06* (2006.01)
(52) U.S. Cl.
USPC .......................................... 384/100; 384/108
(58) Field of Classification Search
USPC .................................... 384/100, 107–120, 12
See application file for complete search history.

(56) References Cited

U.S. PATENT DOCUMENTS

| | | | |
|---|---|---|---|
| 3,138,413 A | 6/1964 | De Woody |
| 3,537,763 A | 11/1970 | Unterberger |
| 5,315,196 A | 5/1994 | Yoshida et al. |
| 5,366,298 A | 11/1994 | Toshimitsu et al. |
| 5,631,761 A | 5/1997 | Lee |
| 5,800,066 A | 9/1998 | Hayashi |
| 2001/0048777 A1 | 12/2001 | Brune et al. |
| 2004/0013327 A1 | 1/2004 | Mukai et al. |

FOREIGN PATENT DOCUMENTS

| | | |
|---|---|---|
| JP | A-4-140509 | 5/1992 |
| JP | U-6-6739 | 1/1994 |
| JP | A-11-277350 | 10/1999 |

(Continued)

OTHER PUBLICATIONS

Official Notice of Rejection dated Jul. 6, 2012 from Japanese Patent Application No. 2009-517394 (with English-language translation).

(Continued)

*Primary Examiner* — Thomas R Hannon
(74) *Attorney, Agent, or Firm* — Oliff & Berridge, PLC

(57) ABSTRACT

A method of fabricating a bearing surface for a gas or air bearing is described. The method comprises taking a bulk bearing portion having at least one bearing surface region and providing a coating on the bearing surface region to define at least one gas pocket. The at least one gas pocket has a depth substantially equal to the thickness of the coating. In one example, laser ablation is used to remove part of the coating to form the gas pockets. The coating may be an anodized coating and the bulk bearing portion may be formed from aluminum. An air bearing component formed using the method is also described.

19 Claims, 2 Drawing Sheets

(56) References Cited

FOREIGN PATENT DOCUMENTS

Figure 1:
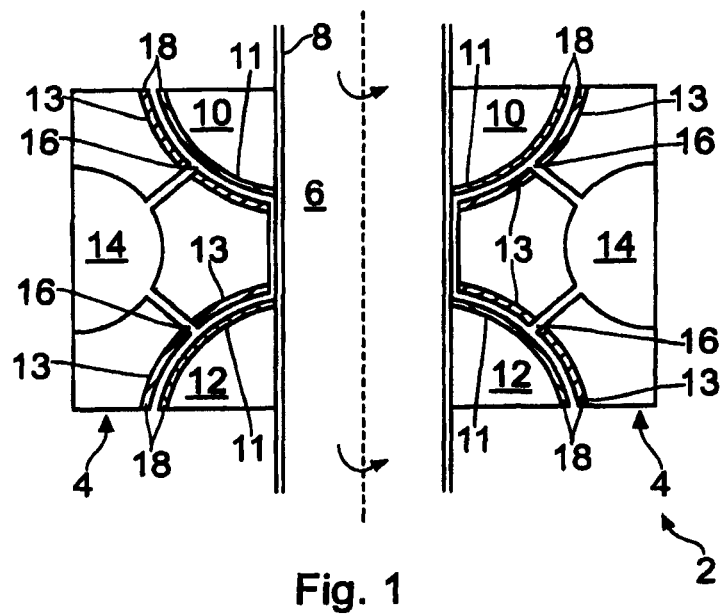

| JP | A-2001-200400 | 7/2001 |
|----|---------------|--------|
| JP | A-2002-70870 | 3/2002 |
| WO | WO 2004/055400 A1 | 7/2004 |

OTHER PUBLICATIONS

Decision of Rejection dated Jul. 3, 2012 from Chinese Patent Application No. 200780024895.0 (with English-language translation).
International Search Report dated Oct. 12, 2007 in International Application No. PCT/GB2007/002402.

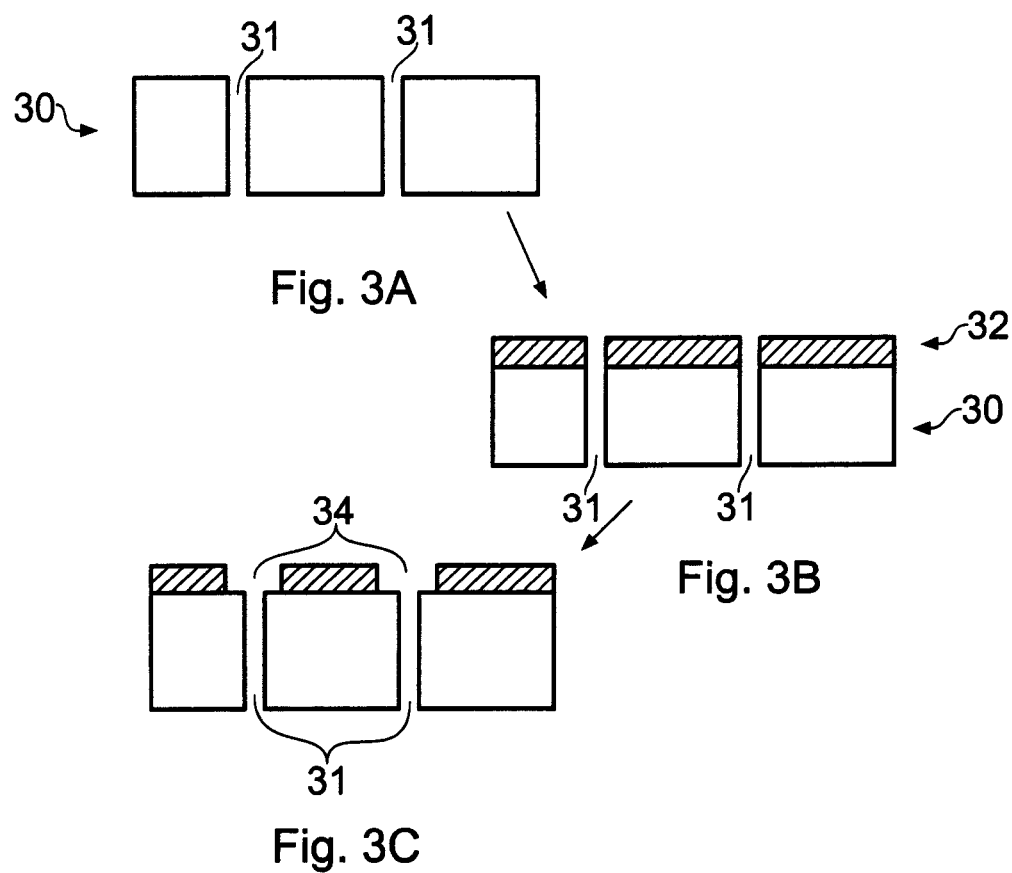
Fig. 3A
Fig. 3B
Fig. 3C
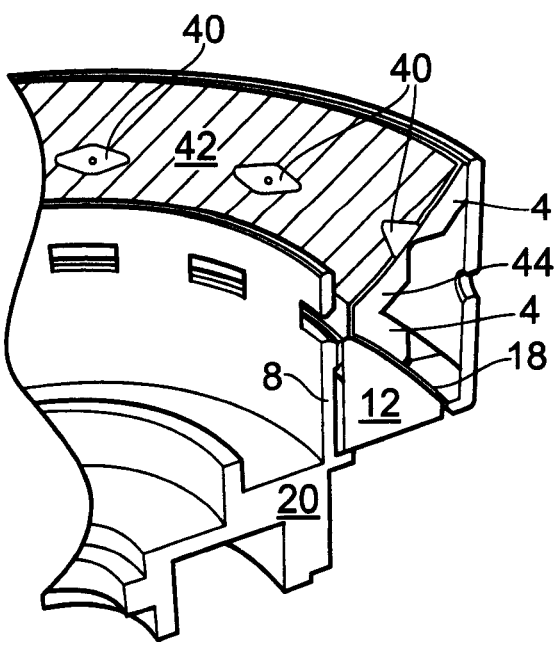
Fig. 4

GAS BEARING AND FABRICATION METHOD

This is a Continuation of application Ser. No. 12/308,687 filed Dec. 22, 2008, which in turn is a National Phase of Application No. PCT/GB2007/002402, filed Jun. 26, 2007. The disclosures of the prior applications are hereby incorporated by reference herein in their entirety.

The present invention relates to gas bearings and in particular to an improved gas bearing and a method for fabricating a bearing surface for such a gas bearing.

Various types of gas bearings are known. For example, known rotary gas bearings comprise a rotor that is rotatable relative to a stator. Under typical running conditions, there is no solid-to-solid contact between opposed bearing surfaces in such bearings. Instead, a film of pressurised gas, typically air, forms a layer or cushion between the bearing surfaces and serves to transfer forces between bearing elements. Since gas bearings are non-contact, they avoid the traditional bearing-related problems of friction, wear, and the need for a lubricant. Air bearings are particularly advantageous in precision positioning and high-speed applications.

Gas bearing operation is optimised when the working gap between opposed bearing surfaces is substantially uniform and invariant. Providing such a uniform working gap requires that the bearing surfaces within such a bearing are formed with a high accuracy. The bearing surfaces also need to be resilient to prevent damage or wear occurring from occasional physical contact (e.g. on start-up or power down). Furthermore, such bearings require some means for introducing a flow of gas between the bearing surfaces to provide the necessary air cushion.

It is known to form bearing surfaces for gas bearings from hard materials such as Silicon Carbide or the like. In such devices, small holes can be drilled through one or more of the bearing surfaces to provide means for injecting gas between opposed bearing surfaces. Furthermore, it is also known to machine (e.g. mill) surface features or so-called "pockets" into the bearing surfaces in the vicinity of the apertures to more evenly distribute the gas which is expelled through such apertures. The dimensions of such pockets have a significant effect on bearing performance and hence need to be formed with high accuracy. Forming such pockets in hard materials is typically time consuming and difficulties can arise in machining to the desired tolerances. For this reason, there has also been much work directed towards forming bearing surfaces from porous materials. However, such materials can also be costly and difficult to work with.

A gas bearing is also described in U.S. Pat. No. 5,800,066 that includes an outer glass layer coated on a supporting ceramic shaft. The ceramic shaft includes multiple air cavities in which a plurality of porous bodies are located. Air pockets are formed in the glass layer in the vicinity of the porous bodies using laser ablation. In order to form air pockets having the required dimensions for air bearing operation, a precision laser machining process is used to remove certain regions of the glass layer. The manufacture of such a bearing structure can thus be seen to be relatively complex and time consuming.

According to a first aspect of the invention, a method of fabricating a bearing surface for a gas bearing comprises the steps of (i) taking a bulk bearing portion having at least one bearing surface region and (ii) providing a coating on the bearing surface region to define at least one gas pocket, wherein step (ii) comprises forming at least one gas pocket that has a depth substantially defined by the thickness of the coating.

The present invention thus provides an improved method for forming the bearing surface of a gas bearing. As outlined above, the bearing surface is the part of the bearing which, during use, is separated from a complimentary bearing surface by a layer of gas. A load applied to the bearing is thus transferred between opposed bearing surfaces of a bearing by the gas layer.

The method of the present invention involves taking a bulk bearing portion having at least one bearing surface region. A coating provided on the bearing surface, which is different to the material of the bulk bearing portion, is then used to define at least one gas pocket. The term "gas pocket" refers to a recess, or hollow pit, that is formed in the bearing surface to aid the distribution of gas that is pumped into the gap between opposed bearing surfaces. Unlike prior art methods in which gas pockets are formed as recesses in the material of the bulk bearing portion, forming gas pockets in a coating has a number of advantages. For example, it allows the bulk bearing portion to be formed from soft and easily machinable materials (e.g. Aluminium) whilst ensuring the bearing surface has a tough, outer, coating. This reduces manufacturing complexity without compromising resistance of the bearing surface to wear and tear during use.

Forming the at least one gas pocket such that it has a depth substantially defined by the thickness of the coating in accordance with the present invention also reduces the complexity of gas pocket formation. In particular, and unlike prior art techniques of the type described in U.S. Pat. No. 5,800,066, the present invention permits the coating thickness to be used to control the depth of the gas pockets that are formed; e.g. the at least one gas pocket may have a depth approximately or substantially equal to the thickness of the coating. The depth of the gas pocket can thus be readily set by controlling the thickness of the coating that is formed on the bearing surface regions and the need for precision laser ablation techniques or the like that remove a well defined depth of material is avoided. Controlling the thickness of a coating is typically a much easier task than implementing a technique, such as laser ablation or machining, that can reliable and repeatably remove a well defined depth of material.

Advantageously, step (ii) comprises the step of forming a coating on the bearing surface region. The step of "forming" may comprise depositing a layer on, and/or modifying the material of, the bulk bearing region. A further step may then be advantageously performed which comprises selectively removing portions of the coating to define said at least one gas pocket. Alternatively, the coating may be pre-formed on the bearing surface region; for example, a bulk bearing portion having a pre-applied coating may be provided. Step (ii) may then advantageously comprise selectively removing portions of said coating to define the at least one gas pocket.

The step of selectively removing at least some of said coating may conveniently comprise the step of using laser ablation. In other words, a high power laser source (for example a carbon dioxide or Nd:YAG laser) may be used to remove regions of the coating from the bulk bearing portion.

Advantageously, the step of selectively removing at least some of said coating comprises the step of removing the coating to expose the underlying bearing surface region of the bulk bearing portion. For example, the laser ablation technique may use a laser power and wavelength which ablates the coating but has negligible effect on the material of the bulk bearing portion. For example, a laser wavelength may be selected that is absorbed by the coating but is reflected by the material of the bulk bearing portion. The duration of laser exposure may also be controlled to minimise ablation of the bulk bearing portion. In this manner, the coating may be removed without any significant effect on the bulk bearing portion.

Although a complete coating may be formed and parts of this coating may then be removed, it is also possible to form (e.g. deposit) the coating only on the required areas of the bearing surface regions. In other words, the coating may be patterned to define the gas pockets during a deposition process. Step (ii) may thus conveniently comprise the step of selectively forming said coating on the bearing surface region, the coating being deposited so as to define the at least one gas pocket.

Advantageously, step (ii) comprises providing a resilient coating (e.g. an anodised coating) on the bearing surface region. Such a coating provides a hard surface which is resilient to damage if opposed bearing surfaces should make contact. The coating may have a hardness greater than 250 μHv, greater than 300 μHv, or greater than 400 μHv. For example, a hard anodised coating on Aluminium may have a hardness in the range of 250-500 μHv. It should be noted that measuring the hardness of coatings using micro-Vickers hardness (i.e. in μHv units) is well known to those skilled in the art.

The coating may comprise multiple layers if required; the layers being of a similar or different material.

Advantageously, step (ii) comprises providing a coating having a thickness less than 100 μm, less than 50 μm, less than 30 μm or less than 20 μm. Preferably, step (ii) comprises providing a coating having a thickness greater than 1 μm, greater than 10 μm or greater than 20 μm. Preferably, the coating has a thickness equal to, or approximately equal to, 25 μm.

Conveniently, step (i) comprises taking a bulk bearing portion comprising readily formable (e.g. easily machinable) material. Advantageously such material is a metal such as Aluminium. Other materials, such as brass, steel or certain plastics, may alternatively provide the bulk bearing portion.

In order to provide the required gas cushion between opposed bearing surfaces, step (i) may comprise taking a bulk bearing portion comprising a hollow cavity or channel for receiving pressurised gas. Furthermore, step (i) may advantageously comprise taking a bulk bearing portion having a bearing surface region in which at least one aperture is formed. In use, these one or more apertures may provide the require gas flow into, or out of, the working gap between bearing surfaces. Such apertures may be in fluid communication with the hollow cavity or channel of the bulk bearing portion. Step (ii) may conveniently comprise providing a coating on said bearing surface region to define a gas pocket in the vicinity of the at least one aperture. In other words, gas expelled via the apertures may pass into the bearing working gap via the gas pockets.

Although apertures may be formed in the bulk bearing portion prior to formation of the coating, it should be noted that such apertures may be formed after the coating deposition step if required. The method may thus advantageously comprise the step of forming (e.g. drilling) one or more holes in said bulk bearing portion.

Conveniently, step (i) comprises taking a bulk bearing portion suitable for inclusion in a rotary bearing. For example, the bulk bearing portion may comprise at least one of a stator and a rotor.

According to a further aspect of the invention, a bearing component is provided that has at least one bearing surface. The bearing component comprises a bulk bearing portion carrying a coating that defines at least one gas pocket, wherein said at least one gas pocket has a depth substantially equal to the thickness of said coating. Such a bearing component may be fabricated in accordance with the above described method.

Conveniently, the coating comprises a resilient coating such as an anodised or hard anodised coating. Advantageously, the bulk bearing portion comprises a hollow core. The bulk bearing portion may conveniently comprise at least one aperture in the vicinity of each gas pocket. As described above, the bulk bearing portion may advantageously comprise a metal such as Aluminium.

A bearing, such as rotary bearing, comprising such a bearing component may also be provided in accordance with the present invention.

According to a further aspect of the invention, a method of fabricating a bearing surface for a gas bearing comprises the steps of; (i) taking a bulk bearing portion having at least one bearing surface region having a coating formed thereon, and (ii) selectively removing parts of the coating to define at least one gas pocket, wherein the step (ii) of selectively removing parts of the coating to define at least one gas pocket comprises the step of removing said parts of the coating to substantially expose the underlying bearing surface region of the bulk bearing portion such that the depth of the at least one gas pocket is substantially equal to the thickness of the coating.

A method for forming a bearing surface is thus described that comprises the step of taking a bulk bearing portion having a bearing surface and using laser ablation to form at least one gas pocket in said bearing surface. The bearing surface of said bulk bearing portion may conveniently comprise a coating, said laser ablation step being arranged to remove at least some of said coating.

A method for fabricating a bearing surface for a gas bearing is also described that comprises the steps of (i) taking a bulk bearing portion having at least one bearing surface region and (ii) forming a coating on the bearing surface region. The coating is preferably a hard coating and step (ii) preferably comprises an anodising or hard anodising technique.

Figure 2:
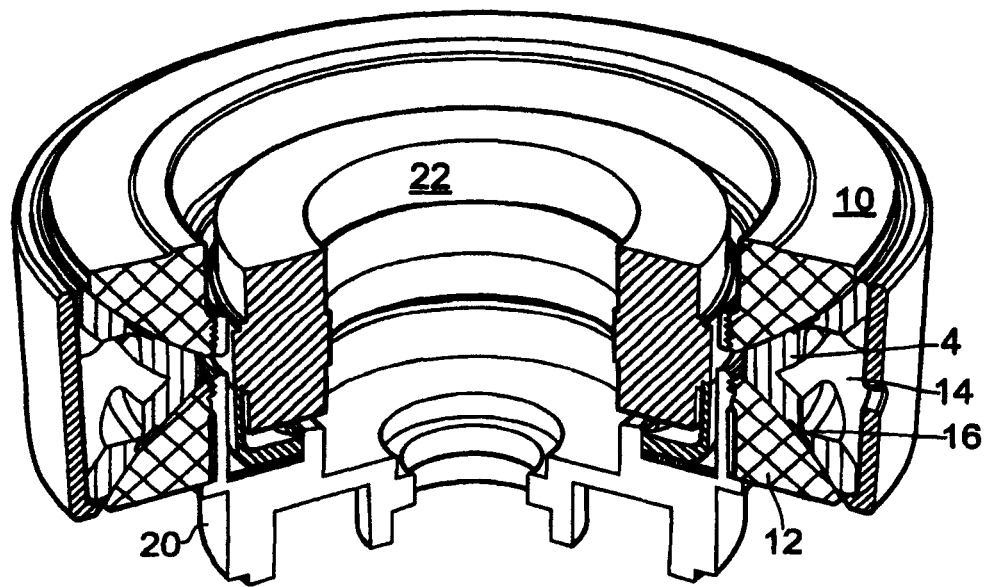

The invention will now be described, by way of example only, with reference to the accompanying drawings in which;

FIG. 1 illustrates a gas bearing formed using a method of the present invention, FIG. 2 shows a perspective view of the gas bearing of FIG. 1, FIG. 3 illustrates a method of the present invention for forming a bearing surface, and FIG. 4 shows an air bearing pocket formed using the method of the present invention.

Referring to FIG. 1, a cross-sectional view through a rotary gas bearing 2 of the present invention is given. The bearing 2 comprises a stator 4 and a rotor 6. The rotor 6 comprises a shaft 8 which carries a first rotor portion 10 and a second rotor portion 12. The first and second rotor portions 10 and 12 have convex bearing surfaces 11 that extend outwardly from the shaft 8. The stator 4 comprises concave bearing surfaces 13 which are shaped to compliment the bearing surfaces 11 of the rotor 6.

The stator 4 is located axially between the first and second rotor portions 10 and 12 such that the bearing surfaces of the rotor 6 and the stator 4 are separated by the required working gap. The stator 4 comprises a hollow core 14 and channels extend therefrom to small apertures 16 provided at the bearing surface. Gas (e.g. air) can thus be passed into the stator-rotor working gap via the apertures 16.

The bulk of the first and second rotor portions 10 and 12 and the stator 4 are formed from Aluminium. Aluminium is lightweight and can be readily machined into the desired shape. However, Aluminium is too soft to provide the required bearing surfaces; i.e. it would be prone to damage if accidental surface contact between the bearing surfaces was to occur during use (e.g. during start-up or power down). A thin (circa. 20 μm) hard anodised coating 18 is thus provided as an outermost layer on the bearing surfaces of both the rotor and the stator. In the vicinity of the apertures 16, this coating is removed by laser ablation to provide gas pockets as described in more detail below.

Referring now to FIG. 2, a more detailed perspective view of the bearing 2 described with reference to FIG. 1 is shown. In particular, FIG. 2 shows the stator 4 and the first and second portions 10 and 12 of the rotor. The rotor also comprises a rotor assembly 20 that forms the shaft 8 described above. In addition, an integral motor 22 is illustrated.

Referring to FIG. 3, a method for forming a bearing surface in accordance with the present invention is illustrated.

FIG. 3a shows a layer of Aluminium 30 having channels 31 formed therein. The Aluminium layer 30 may be the bearing surface of a rotor or a stator of the type described with reference to FIGS. 1 and 2 above. Although a flat (planar) surface is shown for simplicity, the surface of the Aluminium may be machined to any required shape.

FIG. 3b shows a hard anodised layer 32 that has been formed at the surface of the Aluminium layer 30. The thickness of the hard anodised layer 32 is around 20-25 μm and it may be formed using a variety of known anodising methods.

Once the hard anodised layer 32 has been generated, regions thereof may be removed from the aluminium layer 30 in the region of the channels 31 using laser ablation. In particular, the laser ablation technique may be used to form air pockets 34 around the exit apertures of the channels 31. The lateral dimensions of such air pockets can be readily controlled by lateral movement of the laser beam. Whilst the anodised coating 32 can be removed by ablation, the underlying bulk Aluminium layer 30 is significantly more reflective than the coating 32 and laser radiation is thus reflected therefrom. The depth of each air pocket 34 is thus dictated by the thickness of the anodised coating 32. In other words, the thickness of the anodised coating can be used to control the depth of the air pockets. In this manner, the dimensions of the air pockets can be precisely and reliably controlled.

Referring to FIG. 4, a cut-away and expanded view is provided of a stator 4 fabricated in accordance with the method described above with reference to FIG. 3. In particular, the stator 4 can be seen to comprise a plurality of diamond shaped air pockets 40 formed by laser ablation of an anodised coating 42 carried on a bulk layer of Aluminium 44.

Although laser ablation of an anodised coating is described above, the skilled person would recognise that such a technique could be applied using other layer formation and/or layer removal techniques. Furthermore, a single selective layer formation step (e.g. deposition using an appropriate mask) could be used to provide air pockets whilst the coating is being formed.

The invention claimed is:

1. A method of fabricating a bearing surface for a gas bearing comprising the steps of:
    (i) taking a bulk bearing portion having at least one bearing surface region, and
    (ii) providing an anodized layer on the bearing surface region to define at least one gas pocket,
    wherein step (ii) comprises forming the at least one gas pocket to have a depth substantially defined by a thickness of the anodized layer.

2. The method according to claim 1, wherein step (ii) comprises a step of forming the anodized layer on the bearing surface region.

3. The method according to claim 1, wherein step (ii) comprises a step of selectively removing at least some of the anodized layer to define the at least one gas pocket.

4. The method according to claim 3, wherein the step of selectively removing at least some of the anodized layer comprises a step of using laser ablation.

5. The method according to claim 3, wherein a step of selectively removing at least some of the anodized layer comprises a step of removing the anodized layer to substantially expose an underlying bearing surface region of the bulk bearing portion.

6. The method according to claim 1, wherein step (ii) comprises a step of selectively forming the anodized layer on the bearing surface region, the anodized layer being formed so as to define the at least one gas pocket.

7. The method according to claim 1, wherein the anodized layer has a thickness less than 100 mm and greater than 10 mm.

8. The method according to claim 1, wherein the bulk bearing portion comprises readily formable material.

9. The method according to claim 1, wherein the bulk bearing portion comprises a metal.

10. The method according to claim 9, wherein the bulk bearing portion comprises aluminum.

11. A method according to claim 1, wherein
    the bulk bearing portion has a bearing surface region in which at least one aperture is formed, and
    the at least one gas pocket is formed in a vicinity of the at least one aperture.

12. The method according to claim 1, further comprising a step of forming one or more holes in the bulk bearing portion.

13. The method according to claim 1, wherein the bulk bearing portion is suitable for inclusion in a rotary bearing.

14. A method of fabricating a bearing surface for a gas bearing comprising the steps of:
    (i) taking a bulk bearing portion comprising at least one bearing surface region having an anodized layer formed thereon, and
    (ii) selectively removing parts of the anodized layer to define at least one gas pocket,
    wherein a step (ii) of selectively removing parts of the anodized layer to define at least one gas pocket comprises a step of removing the parts of the anodized layer to substantially expose an underlying bearing surface region of the bulk bearing portion such that a depth of the at least one gas pocket is substantially equal to a thickness of the anodized layer.

15. A bearing component having at least one bearing surface, the bearing component comprising:
    a bulk bearing portion carrying an anodized layer that defines at least one gas pocket, wherein the at least one gas pocket has a depth substantially equal to a thickness of said anodized layer.

16. The bearing component according to claim 15, wherein the bulk bearing portion comprises at least one aperture in a vicinity of each gas pocket.

17. The bearing component according to claim 15, wherein the bulk bearing portion comprises metal.

18. The bearing component according to claim 17, wherein the bulk bearing portion comprises aluminum.

19. A bearing comprising a bearing component according to claim 15.

* * * * *